United States Patent
Fujita et al.

(10) Patent No.: US 9,963,804 B2
(45) Date of Patent: May 8, 2018

(54) POLYAMIDE MONOFILAMENT AND FIBER PACKAGE THEREOF

(71) Applicant: Toray Industries, Inc., Tokyo (JP)

(72) Inventors: Morihiko Fujita, Nagoya (JP); Tsuyoshi Hayashi, Nagoya (JP)

(73) Assignee: Toray Industries, Inc. (JP)

( * ) Notice: Subject to any disclaimer, the term of this patent is extended or adjusted under 35 U.S.C. 154(b) by 0 days. days.

(21) Appl. No.: 15/514,947

(22) PCT Filed: Sep. 24, 2015

(86) PCT No.: PCT/JP2015/076866
§ 371 (c)(1),
(2) Date: Mar. 28, 2017

(87) PCT Pub. No.: WO2016/052287
PCT Pub. Date: Apr. 7, 2016

(65) Prior Publication Data
US 2017/0226664 A1    Aug. 10, 2017

(30) Foreign Application Priority Data

Sep. 30, 2014   (JP) ................. 2014-201630

(51) Int. Cl.
| | | |
|---|---|---|
| *D01F 6/60* | (2006.01) | |
| *C08L 67/02* | (2006.01) | |
| *C08L 77/02* | (2006.01) | |
| *D01D 4/02* | (2006.01) | |
| *D01D 5/253* | (2006.01) | |

(52) U.S. Cl.
CPC ............. *D01F 6/60* (2013.01); *C08L 67/02* (2013.01); *C08L 77/02* (2013.01); *D01D 4/02* (2013.01); *D01D 5/253* (2013.01)

(58) Field of Classification Search
CPC ........................................... D01F 6/60
USPC ........................................... 524/115
See application file for complete search history.

(56) References Cited

U.S. PATENT DOCUMENTS

| | | | | |
|---|---|---|---|---|
| 4,983,448 A | * | 1/1991 | Karageorgiou | D01F 6/60 428/364 |
| 5,238,982 A | * | 8/1993 | Adhya | C08K 5/521 264/178 F |
| 2012/0280073 A1 | | 11/2012 | Tomita et al. | |

FOREIGN PATENT DOCUMENTS

| | | | |
|---|---|---|---|
| JP | 58-180674 A | | 10/1983 |
| JP | 2007-270363 A | | 10/2007 |
| JP | 2008-274484 A | | 11/2008 |
| JP | 2009-74209 A | | 4/2009 |
| JP | 2009-108438 A | | 5/2009 |
| JP | 2010-222112 A | | 10/2010 |
| WO | WO 01/31099 | * | 5/2001 |
| WO | 2011/086954 A1 | | 7/2011 |

* cited by examiner

*Primary Examiner* — Doris L Lee
(74) *Attorney, Agent, or Firm* — DLA Piper LLP (US)

(57) ABSTRACT

A polyamide monofilament is characterized in that the abrasion tension thereof when passed through a ceramic guide is 0.3 cN/dtex or less and in that the amount of static electricity generated at the exit of a chromium round bar guide, which is a frictional body, when the polyamide monofilament is passed through the chromium round bar guide, is 300 V or less. This polyamide monofilament and fiber package provide a gauze woven fabric for which tension is low when passing through a thread path guide when warping warp yarn, for which generation of static electricity is suppressed, and which has excellent weaving productivity.

3 Claims, 2 Drawing Sheets

POLYAMIDE MONOFILAMENT AND FIBER PACKAGE THEREOF

TECHNICAL FIELD

This disclosure relates to a polyamide monofilament and its fiber package, more specifically, a polyamide monofilament and its fiber package capable of realizing excellent quality of a mesh woven product as well as high weaving productivity.

BACKGROUND

A mesh woven product called "screen mesh" produced by weaving a monofilament has been widely used in the fast-growing field of electronics as a mesh cloth for screen printing in printed circuit boards, and also as a shaped filter used in automobiles and home appliances. Exemplary applications of the mesh woven product produced by weaving a monofilament in the application of screen printing include T shirts and flags, signboards, plates of vending machines, car panels, signs in the interior or exterior, ballpoint pens, various cards, name plates, scratch cards, braille, CDs and DVDs, printed boards, plasma displays, and liquid crystal displays. Exemplary applications in the filter applications include lint filters that prevent reattachment of lint in water to laundry, filters in the air conditioner that remove dust in the room, and shaped filters in vacuum cleaners that remove dust and trash. Exemplary applications in medical field include a filter that removes bubbles and the like in blood infusion kits or artificial dialysis circuits. The mesh woven product also plays an important role in automobile applications including use in fuel flow passages such as fuel pumps and fuel injectors as well as ABS, brakes, transmissions, and power steering, and also, for prevention of foreign substances from entering into electromagnetic valves as well as filtration and cleaning in electronic stability control and VVT and other oil hydraulic circuits that are the latest fuel consumption improving mechanisms.

Of these, in the fields of electronics and automobiles which are in rapid growth, there is a demand for the mesh woven products having a higher performance including clearer printing performance and higher filter performance. Accordingly, mesh woven products having reduced weight and reduced thickness have been developed, and these products are required to have a higher quality. This in turn means that there is a demand for a monofilament having consistent quality with no fineness inconsistency, lumps, tight picks, vertical lines or the like. In view of such a situation, many technologies have been proposed as technologies to improve the quality of monofilaments.

For example, Japanese Unexamined Patent Publication (Kokai) No. 2010-222112 proposes controlling the kinetic friction coefficient of the yarn and take up width of the drum in a drum-shaped package form of polyamide monofilament.

International Publication WO 2011/086954 proposes controlling the kinetic friction coefficient of the yarn, taper angle of the package end, gradient of unwinding tension fluctuation, and shrinkage stress in wet heating of the inner layer of the polyester monofilament at 1 mm interior of the package in a package of a wound polyester monofilament.

While the method described in Japanese Unexamined Patent Publication (Kokai) No. 2010-222112 attempts to improve the quality for a defect called "tight pick" associated with the use of the weft, the problem of the quality relating to the defect called "vertical line" associated with the use of the warp has been left unsolved.

We found that vertical lines are caused by the high tension of the yarn upon passage of the yarn guide in the warping that leaves strain in the yarn and large fluctuation of the tension that unstabilizes the stretching of the yarn. Accordingly, we focused on reducing the tension upon passage of the yarn guide and also, on reducing the fluctuation of the tension. To reduce the fluctuation, the silicon-added oil described in International Publication WO 2011/086954 was applied to the polyamide monofilament.

Nonetheless, while the method described in International Publication WO 2011/086954 reduces the tension upon passage of the yarn guide in the warping, static electricity was generated between the moving yarn and the yarn guide resulting in the yarn adhesion and the like and stable warping became difficult. Under such a situation, decreases in the warping speed were required to suppress the static electricity generation, and this invited loss of weaving productivity. Accordingly, further improvement has been necessary.

It could therefore be helpful to provide a polyamide monofilament that exhibits low tension and reduces static electricity generation when the yarn is passed through a yarn guide in the warping to thereby enable production of a mesh woven product with excellent quality as well as high weaving productivity. It could also be helpful to provide its fiber package.

SUMMARY

We thus provide:

(1) A polyamide monofilament wherein abrasion tension upon passage of a ceramic guide is up to 0.3 cN/dtex and static electricity generated at the exit of a chromium round rod guide upon passage of the chromium round rod guide which is a frictional body is up to 300 V.

(2) A fiber package prepared by winding the polyamide monofilament according to (1).

(3) A fiber package according to (2) wherein the fiber package is in the shape of a pirn.

The polyamide monofilament and the fiber package exhibit low tension and reduced static electricity generation when the yarn is passed by a yarn guide in the warping to thereby enable production of a mesh woven product with excellent quality as well as high weaving productivity.

EXPLANATION OF NUMERALS

Figure 1:
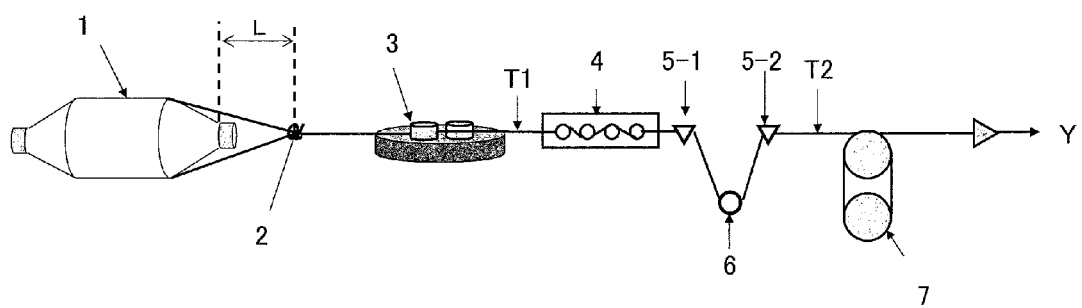
FIG. 1 is a schematic view of apparatus used to measure abrasion tension.

1: yarn package
2: first guide
3: tenser guide
4: pin guide
5-1: alumina yarn path control guide
5-2: alumina yarn path control guide
6: frictional body (aluminum pin guide)
7: speed control roller
8: chromium round rod guide T1: tension at the exit of the tenser guide
T2: tension after passing the frictional body
L: unwinding distance
Y: fiber-feeding direction

DETAILED DESCRIPTION

Next, examples of our monofilaments and fiber packages are described in detail.

The polyamide is a polymer wherein a hydrocarbon group is bonded to the backbone chain by amide bond, and in view of the good dyability, washing durability, and mechanical properties, the polyamide is preferably a polyamide mainly comprising polycaproamide or polyhexamethylene adipamide. The term "mainly comprising" as used herein means that content of the polycaproamide in terms of the ε-caprolactam unit constituting the polycaproamide in the polycaproamide or content of the polyhexamethylene adipamide in terms of the hexamethylene diammonium adipate unit constituting the polyhexamethylene adipamide in the polyhexamethylene adipamide is respectively at least 80% by mole, and more preferably at least 90% by mole. Other components are not particularly limited, and examples include units such as aminocarboxylic acid, dicarboxylic acid, and diamine which are monomers constituting polydodecanoamide, polyhexamethylene azelamide, polyhexamethylene sebacamide, polyhexamethylene dodecanoamide, polymetaxylylene adipamide, polyhexamethylene terephthalamide, polyhexamethylene isophthalamide and the like.

The degree of polymerization of the polyamide may be arbitrarily selected from an adequate range depending on the properties required for the polyamide resin (chip) or products thereof (for example, filament or yarn) or in view of the stable production. The degree of polymerization, however, is preferably 2.0 to 3.3, and more preferably 2.4 to 3.3 in terms of relative viscosity (98% sulfuric acid). When the relative viscosity is at least 2.0, the strength required for mesh woven products will be realized while the relative viscosity of up to 3.3 will result in the good spinnability.

The polyamide monofilament should exhibit an abrasion tension of up to 0.3 cN/dtex. When the abrasion tension is in excess of 0.3 cN/dtex, tension upon passage of the yarn guide in the warping will be increased to leave deformation in the filament and, also, the increased tension fluctuation invites unstable stretching of the filament and, hence, poor processability. This results in generation of vertical lines, and poor product quality. The tension is preferably 0.1 to 0.3 cN/dtex.

The abrasion tension is the tension of the polyamide monofilament after passing by a frictional body (a ceramic guide) at a passing speed of 600 m/min and then through a yarn guide. The abrasion tension is measured at a position 50 cm downstream of the yarn path control guide, and the value measured is a substitute for the tension upon passage by the yarn guide in the warping. The method used to measure the abrasion tension is described by referring to FIG. 1.

The polyamide filament is unwound in distance L (unwinding distance) from the end surface of fiber package 1 to first guide 2 of 30 cm, passed through a tenser guide 3 to adjust tension (T1) at the exit of the tenser guide 3 to 0.1 cN/dtex, through an alumina yarn path control pin guide 4 (4 guides each having a diameter of 3 mm placed at interval of 10 mm) provided at a position 80 cm from the exit of the tenser guide 3, through an alumina yarn path control guide 5-1 provided at a position 15 cm from the exit of the pin guide 4, by the frictional body 6 of an aluminum pin guide having a diameter of 3 mm located 15 cm lower than the alumina yarn path control guides 5-1 and 5-2 at a bending angle of 60°, and through the alumina yarn path control guide 5-2, and then wound around a roller 7 to thereby supply the filament at a controlled passing speed of 600 m/min (the yarn supplier not shown). The tension (T2) is measured at a position 50 cm from the guide 5-2. The value obtained by dividing this T2 by the fineness is used for the abrasion tension.

The amount of static electricity generated by the polyamide monofilament should be up to 300 V. When the amount of static electricity generated is in excess of 300 V, static electricity will be generated between the moving yarn and the yarn guide in the warping resulting in the yarn adhesion and the like and stable warping will be difficult. In such a situation, a decrease in the warping speed will be required to suppress static electricity generation, and this invites loss of weaving productivity. The amount of static electricity generated is preferably up to 250 V.

The amount of static electricity generated is the amount of static electricity generated at a position 5 cm after passing the frictional body (chromium round rod guide) when the monofilament is passed at a speed of 300 m/min under the environment of 20° C. at a relative humidity of 40%. The method used for the measurement is described by referring to FIG. 2.

The amount of static electricity generated is measured in an environment at a temperature of 20° C. and relative humidity of 40%. The distance L (unwinding distance) from the edge of the fiber package 1 to the first guide 2 is 30 cm. The yarn from the fiber package 1 is passed through the tenser guide 3 and the tension (T1) at the exit of the tenser guide 3 is adjusted to 0.3 cN/dtex. The yarn is then bent at 90° at the chromium round rod guide 8 (diameter 50 mm) at a position 80 cm downstream of the exit of the tenser guide 3, and the yarn is fed (the feeding apparatus not shown) while controlling the passage speed to 300 m/min. The amount of static electricity generated is measured at position V, which is 5 cm downstream of the chromium round rod guide 8 by using a static meter (Apparatus name, Digital static meter KSD-2000; manufactured by KASUGA ELECTRIC WORKS LTD.).

Both the abrasion tension and amount of static electricity generated by the polyamide monofilament as described above should be in an adequate range. When the abrasion tension is low and the amount of static electricity generated is high, static electricity will be generated between the moving yarn and the yarn guide in the warping, and this results in the yarn adhesion and loss of product quality. In such a situation, a decrease in the warping speed will be required to suppress static electricity generation, and this invites loss of weaving productivity. On the other hand, when the abrasion tension is high and the amount of static electricity generated is low, tension upon passage through the yarn guide in the warping will be increased to leave deformation in the filament and, also, the increased tension fluctuation invites unstable stretching of the filament and loss of product quality. In such a situation, a decrease in the warping speed will be required to stabilize stretching of the filament, and this invites loss of weaving productivity. Accordingly, control of both the abrasion tension and the amount of static electricity generated to a low level enables production of the polyamide monofilament and the fiber package capable of producing a mesh woven product having an excellent quality as well as a high weaving productivity.

The polyamide monofilament preferably has a fineness of 8 to 66 dtex. The fineness in such a range enables production of a high quality, light weight, thin mesh woven product that can cope with the improvement in the clearness of the printing and filter performance.

The spinning oil used in the polyamide monofilament is constituted of a smoothing agent, an emulsifier, and an antistatic agent. Exemplary smoothing agents used in the spinning oil include fatty acid esters, ether esters, alkyl ethers, nonionic surfactants, PEG esters, mineral oils, and modified silicones, and inclusion of at least one modified silicone is preferable since use of the modified silicone improves yarn surface lubricity and this prevents yarn breakage in the unwinding and sewing, thereby improving productivity, smoothness, texture, and washing durability as well as quality appearance. The modified silicone is preferably an organic modified silicone in view of the remaining of the silicone after adding in the spinning oil. Exemplary organic modified silicones include alkyl-modified silicones, alkyl/aralkyl-modified silicones, alkyl/polyether-modified silicones, polyether-modified silicones, fluoro-modified silicones, amino-modified silicones, monoamine-modified silicones, diamine-modified silicones, carboxyl-modified silicones, and carbinol-modified silicones, and the most preferred is use of a polyether-modified silicone and an amine-modified silicone.

The proportion of the modified silicone is preferably 1.5 to 10% by mass in relation to the weight of the spinning oil. When the proportion is at least 1.5% by mass, tension of the yarn upon passage of the yarn guide in the warping is less likely to be high, and strain is less likely to be left in the yarn, and the fluctuation in the tension is prevented and the yarn is likely to be stably stretched. Accordingly, the processability is likely to be high and the product enjoys a high quality. When the proportion is up to 10% by mass, there will be no productivity problems such as pipe clogging in the oiling step of the melt spinning. The proportion is preferably 1.5 to 7.0% by mass. The proportion of the smoothing agent is preferably 40 to 70% by mass in relation to the mass of the spinning oil.

The polyamide monofilament preferably has a modified silicone coated on the fiber surface in an amount of at least 5 ppm in relation to the fiber mass. When the amount of the modified silicone is in such a range, the modified silicone will be uniformly coated on the modified silicone without unevenness to thereby realize the adequate abrasion tension.

Exemplary antistatic agents used for the spinning oil include ionic surfactants such as known anionic surfactants, cationic surfactants, and amphoteric surfactants. Since the polyamide fiber is a hydrophilic fiber, hydrophobic silicone will be localized on the surface of the polyamide yarn and this promotes static electricity generation, and accordingly, use of an antistatic agent adapted for use with the polyamide, silicone is required, and the preferred is use of an anionic surfactant. Exemplary anionic surfactants include sulfonate, phosphate, and carboxyl surfactants, and the more preferred are sulfonate and phosphate surfactants in view of the good compatibility with the silicone as well as the improved lubricity.

The proportion of the antistatic agent in relation to the weight of the spinning oil may be adequately determined depending on the amount of the static electricity generated. The proportion, however, is preferably 3 to 12% by mass. Antistatic effect is achieved when this proportion is at least 3% by mass while further processability is realized without excessive increase in the friction when the proportion is up to 12% by mass. More preferably, the proportion is 5 to 10% by mass.

The emulsifier used for the spinning oil may be a known nonionic surfactant. Exemplary nonionic surfactants include PEG, ester, and amide surfactants and, in view of the stability of the emulsion, compatibility with the antistatic agent, and compatibility with the oligomer, the preferred are ester emulsifiers. The amount of the emulsifier used is preferably 20 to 30% by mass in relation to the spinning oil.

The spinning oil for the polyamide monofilament may be used in any form used in conventional spinning oil including emulsion and straight forms. In view of reducing adverse effects on the work environment and load on the global environment caused by the mineral oil volatilized in the spinning step, preferred is the use in emulsion form, and more preferred is use of an emulsion prepared by dilution with pure water. The emulsion concentration is preferably 3 to 20% by mass in relation to the mass of the spinning oil.

The spinning oil used for the polyamide monofilament is supplied at a position where the yarn has been sufficiently cooled by using a known oiling device such as oiling roller and oil-supply guide. More preferably, the spinning oil is supplied at a position where the yarn has been cooled to the temperature of up to 40° C.

The polyamide monofilament preferably has the spinning oil in an amount of 0.3 to 1.5% by mass attached thereto in relation to the fiber mass. When the amount of the spinning oil is in such range, generation of oil droplets and scum are suppressed in the further processing step. More preferably, the amount of the spinning oil is 0.3 to 0.8%.

In producing the polyamide monofilament, the method used may be any known method used in the melt spinning technology. Production by melt spinning may be accomplished either by a method wherein the spinning and drawing steps are continuously carried out (direct spinning and drawing method) or by a method wherein the drawing step is carried out after winding the undrawn yarn (two-step method). Preferable, however, is the two-step method in view of stable winding of the yarn with no winding failure even if the yarn has a reduced friction.

In an exemplary two-step method, polyamide resin chips are melted in an extruder at a temperature 20 to 50° C. higher than the melting point of the polyamide and the foreign substance other than the polymer is removed and the polymer flow is adjusted by using a known spinning pack, and then, the polymer is ejected from ejection hole of the nozzle, and after cooling the yarn, the yarn is coated with the spinning oil as described above by using an oiling device, and after taking up the undrawn yarn by a take-up roller, the undrawn yarn is wound at a winding speed of 400 to 800 m/minute.

In a different step, after passing the wound undrawn yarn around a pin guide and heating the yarn, the yarn is drawn at a draw ratio of 3.0 to 5.0, passed through a hot plate heater to conduct a heat treatment, and wound at a winding speed of 400 to 1000 m/minute and a winding spindle rotation speed of 2000 to 9000 rpm so that ratio of the spindle rotation speed to the winding speed is 5 to 9.

The heat treatment is preferably conducted at a temperature of 150 to 200° C. When the temperature is at least 150° C., boiling water shrinkage will be suppressed and size stability of the resulting mesh woven product is likely to be favorable. On the other hand, when the temperature is up to 200° C., staining of the heated drawing roller will be prevented, and spinnability is likely to be improved.

The package of the polyamide monofilament may be in any of the drum, pirn, and cheese shapes. However, the yarn is preferably wound in pirn shape in view of stable winding in good package with no winding failure even if the yarn has a reduced friction.

EXAMPLES

The physical properties in the Examples were measured by the procedures as described below.

A. Abrasion Tension

The abrasion tension was measured by the measurement apparatus shown in FIG. 1. The distance L (unwinding distance) from the edge of the fiber package 1 to the first guide 2 was 30 cm. The yarn from the fiber package 1 was passed through the tenser guide 3. After adjusting the tension (T1) at the exit of the tenser guide 3 to 0.1 cN/dtex, the yarn was passed through the aluminum yarn path control pin guides 4 (4 guides each having a diameter of 3 mm placed at an interval of 10 mm) which is located at a position 80 cm from the exit of the tenser guide 3, and after passing by the alumina yarn path control guide 5-1 at a position 15 cm from the exit of the pin guide 4, the yarn was passed by the frictional body 6 which is an aluminum pin guide (diameter, 3 mm) where the yarn was bent at an angle of 60°. After passing by the alumina yarn path control guide 5-2, the yarn was fed (the feeding apparatus not shown) while controlling the passage speed to 600 m/min by circling the yarn around the roller 7, and the tension (T2) was measured at a position 50 cm from the guide 5-2. The T2 divided by the fineness of the fiber measured was used as the abrasion tension.

B. Fineness (Dtex)

Fineness was measured according to JIS L1013 (2010), 8.3, method A. By using a sizing reel having a perimeter of 1.125 m, a reeled yarn (400 windings in the case of the sample of up to 27 dtex or 200 windings in the case of the sample of at least 28 dtex) was prepared, and after drying in a hot air drier (105±2° C.×60 minutes), the reeled yarn was weighed by a balance. The fineness was calculated from the value including the official moisture regain of the polyamide (4.5%).

C. Amount of Static Electricity Generated (V)

Figure 2:
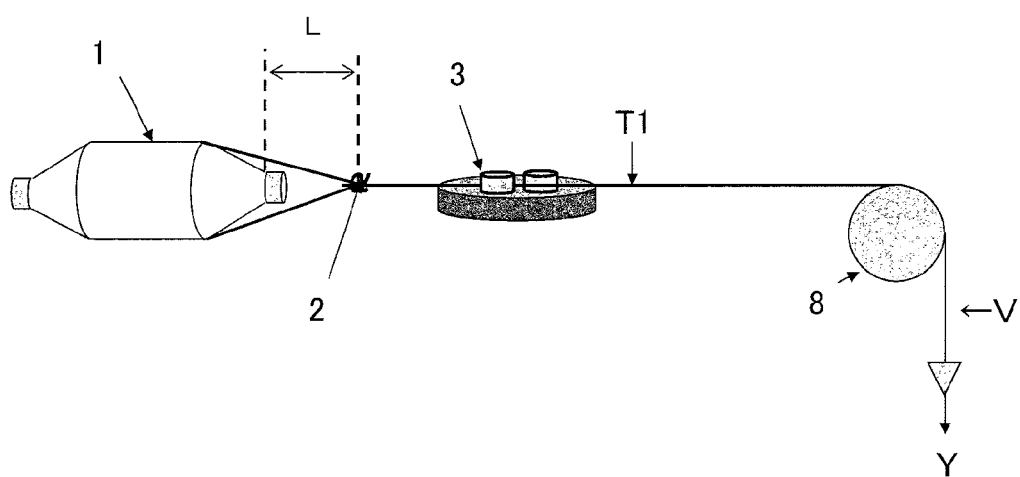
FIG. 2 is a schematic view of apparatus used to measure the amount of static electricity generated.

The amount of static electricity generated was measured by the apparatus shown in FIG. 2 in an environment at a temperature of 20° C. and relative humidity of 40%. The distance L (unwinding distance) from the edge of the fiber package 1 to the first guide 2 was 30 cm. The yarn from the fiber package 1 was passed through the tenser guide 3 and the tension (T1) at the exit of the tenser guide 3 was adjusted to 0.3 cN/dtex. The yarn was bent at 90° at the chromium round rod guide 8 (diameter 50 mm) at a position 80 cm from the exit of the tenser guide 3, and the yarn was fed (the feeding apparatus not shown) while controlling the passage speed to 300 m/min. The amount of static electricity generated was measured at position V which is 5 cm from the chromium round rod guide 8 by using a static meter (Apparatus name, Digital static meter KSD-2000; manufactured by KASUGA ELECTRIC WORKS LTD.).

D. Spinning Oil Coating Weight (%)

Coating weight of the spinning oils was determined by a measurement using MQC pulse nuclear magnetic resonance system manufactured by Oxford.

E. Vertical Line Quality

Evaluation of the as-woven fabric by experienced testers was conducted to confirm the vertical line quality, and the results were evaluated by the following 3 grades.

A: good (no vertical lines)
B: slightly poor (slight vertical lines)
C: poor (considerable vertical lines)

A was evaluated pass while B and C were evaluated fail.

F. Upper Limit of the Warping Speed and Weaving Productivity

The fiber package is placed in a warper, and the warper was operated for 10 minutes at a warping speed of 200 m/min to evaluate whether stable warping could be accomplished without troubles such as generation of static electricity and yarn adhesion. When the warping was possible, the speed was increased at a rate of 10 m/min, and the upper limit of the speed capable of conducting a stable warping was used for the upper limit of the warping speed. When the warping was not possible, the speed was reduced at a rate of 10 m/min, and the upper limit of the speed capable of conducting a stable warping was used for the upper limit of the warping speed. The result was evaluated by the following 3 grades:

A: at least 250 m/min
B: at least 200 m/min
C: less than 200 m/min

The weaving productivity was evaluated "good" for A and B, and "poor" for C.

Preparation of Spinning Oil

Spinning oil was prepared as shown in Tables 1 and 2.

TABLE 1

| | Spinning oil No. | | A-1 | A-2 | A-3 | B-1 | C-1 |
|---|---|---|---|---|---|---|---|
| Smoothing agent | Modified silicone component | — | Amine-modified silicone | Amine-modified silicone | Amine-modified silicone | Polyether-modified silicone | Amine-modified silicone |
| | Content of modified silicone component | % | 5.0 | 5.0 | 5.0 | 5.0 | 5.0 |
| | Aliphatic ester component | — | Fatty acid alkyl ester | Fatty acid alkyl ester | Fatty acid alkyl ester | Fatty acid alkyl ester | Fatty acid alkyl ester |
| | Content of aliphatic ester component | % | 65 | 62 | 57 | 62 | 57 |
| Antistatic agent | Antistatic agent component | — | Phosphate-type | Phosphate-type | Phosphate-type | Phosphate-type | Sulfonate-type |
| | Content of antistatic agent | % | 2 | 5 | 10 | 5 | 10 |
| Emulsifier | Emulsifier component | — | Polyhydric ester | Polyhydric ester | Polyhydric ester | Polyhydric ester | Polyhydric ester |
| | Content of emulsifier | % | 28 | 28 | 28 | 28 | 28 |

TABLE 2

| Spinning oil No. | | | E-1 | E-2 | E-3 | E-4 | E-5 | F-1 | G-1 |
|---|---|---|---|---|---|---|---|---|---|
| Smoothing agent | Modified silicone component | — | None | Amino-modified silicone | Amino-modified silicone | Amino-modified silicone | Amino-modified silicone | None | Poly-ether-modified silicone |
| | Content of modified silicone component | % | 0 | 1.0 | 1.5 | 3.0 | 7.0 | 0 | 1.0 |
| | Aliphatic ester component | — | Fatty acid alkyl ester | Fatty acid alkyl ester | Fatty acid alkyl ester | Fatty acid alkyl ester | Fatty acid alkyl ester | Fatty acid ester | Fatty acid alkyl ester |
| | Content of aliphatic ester component | % | 67 | 66 | 65.5 | 64 | 60 | 70 | 64 |
| Antistatic agent | Antistatic agent component | — | Phosphate-type | Phosphate-type | Phosphate-type | Phosphate-type | Phosphate-type | Amino ether | Alkyl sulfonate |
| | Content of antistatic agent | % | 5 | 5 | 5 | 5 | 5 | 10 | 7 |
| Emulsifier | Emulsifier component | — | Poly-hydric ester | Poly-hydric ester | Poly-hydric ester | Poly-hydric ester | Poly-hydric ester | Nonionic surfactant | Poly-hydric ester |
| | Content of emulsifier | % | 28 | 28 | 28 | 28 | 28 | 20 | 28 |

Examples 1 to 2 and Comparative Example 1

Nylon 66 chips having a relative viscosity (98% sulfuric acid) of 2.8 were melted at 293° C., and the molten resin was supplied to a melt-spinning pack with the polymer ejection rate per single ejection hole adjusted to 1.6 g/min. The yarn was spun by ejecting the resin from the spinneret and cooled to a temperature of up to 40° C. by a uniflow chimney which sprays cold air from one direction. The yarn comprising 4 filaments was divided into each yarn, and oiled with a spinning oil containing 5% by mass of an amino-modified silicone and 2% by mass (spinning oil A-1), 5% by mass (spinning oil A-2), or 10% by mass (spinning oil A-3) of a phosphate type anionic surfactant (an antistatic agent) by an oiling roller-type oiling device so that the spinning oil coating weight would be 0.6%, and the yarn was then taken up and wound on first and second godet rollers at 500 m/minute to obtain the undrawn yarn. In a different step, the resulting undrawn yarn was passed around the pin guide, drawn at a draw ratio of 4.2, passed through a hot plate heater heated to 160° C. to conduct a heat treatment, and wound at a winding speed of 625 m/minute and a winding spindle rotation speed of 5313 rpm so that ratio of the spindle rotation speed to the winding speed was 8.5 to thereby obtain a pirn-shaped package of 8 dtex nylon 66 monofilament.

The resulting nylon 66 monofilament was evaluated for the abrasion tension, amount of static electricity generated, spinning oil coating weight, upper limit of the warping speed, weaving productivity, and vertical line quality. The results are shown in Table 3.

Example 3

Spinning was conducted by repeating the procedure of Example 1 except for the use of spinning oil (B-1) containing 5% by mass of a polyether-modified silicone. The resulting nylon 66 monofilament was evaluated for the abrasion tension, amount of static electricity generated, spinning oil coating weight, upper limit of the warping speed, weaving productivity, and vertical line quality. The results are shown in Table 3.

Example 4

Spinning was conducted by repeating the procedure of Example 1 except that the anionic surfactant used for the antistatic agent was sulfonate type surfactant, and content of the antistatic agent was 10% by mass (spinning oil C-1). The resulting nylon 66 monofilament was evaluated for the abrasion tension, amount of static electricity generated, spinning oil coating weight, upper limit of the warping speed, weaving productivity, and vertical line quality. The results are shown in Table 3.

Examples 5 to 7 and Comparative Example 2 to 3

Spinning was conducted by repeating the procedure of Example 1 except that amino-modified silicone was 0% by mass (spinning oil E-1), 1.0% by mass (spinning oil E-2), 1.5% by mass (spinning oil E-3), 3.0% by mass (spinning oil E-4), or 7.0% by mass (spinning oil E-5), and the resulting nylon 66 monofilament was evaluated for the abrasion tension, amount of static electricity generated, spinning oil coating weight, upper limit of the warping speed, weaving productivity, and vertical line quality. The results are shown in Table 3.

Example 8

Spinning was conducted by repeating the procedure of Example 1 except that the spinning oil used was spinning oil E-5 and the oiling was conducted so that the spinning oil coating weight would be 1.0%, and the resulting nylon 66 monofilament was evaluated for the abrasion tension, amount of static electricity generated, spinning oil coating weight, upper limit of the warping speed, weaving productivity, and vertical line quality. The results are shown in Table 3.

Example 9

Spinning was conducted by repeating the procedure of Example 1 except that the spinning oil used was spinning oil A-2, the polymer ejection rate per single ejection hole was 4.1 g/min, the winding speed of the undrawn yarn was 450 m/minute, the draw ratio was 4.55, and the oiling was conducted so that the spinning oil coating weight would be 0.6% to obtain a pirn-shaped package of 22 dtex nylon 66 monofilament. The resulting nylon 66 monofilament was evaluated for the abrasion tension, amount of static electricity generated, spinning oil coating weight, upper limit of the warping speed, weaving productivity, and vertical line quality. The results are shown in Table 3.

Comparative Example 4

Nylon 66 chips having a relative viscosity (98% sulfuric acid) of 2.8 were melted at 293° C., and the molten resin was supplied to a melt-spinning pack with the polymer ejection rate per single ejection hole adjusted to 2.4 g/min. The yarn was spun by ejecting the resin from the spinneret and cooled to a temperature of up to 40° C. by a uniflow chimney which sprays cold air from one direction. The yarn comprising 6 filaments was divided into each yarn, and oiled with a spinning oil F-1 by an oiling roller-type oiling device with the speed adjusted so that the spinning oil coating weight would be 0.6%. The yarn was then wound 3.5 times on the first godet roller at 768 m/minute and then 4.5 times on the second godet rollers which has been heated to 170° C. to conduct the heat treatment, and in the meanwhile, the yarn is drawn 4.05 times between the first godet roller and the second godet roller, and wound at a winding speed of 3000 m/minute by a cam traverse-type winding system to thereby obtain a drum-shaped package of 8 dtex nylon 66 monofilament. The resulting nylon 66 monofilament was evaluated for the abrasion tension, amount of static electricity generated, spinning oil coating weight, upper limit of the warping speed, weaving productivity, and vertical line quality. The results are shown in Table 3.

Comparative Example 5

Spinning was conducted by repeating the procedure of Example 1 except for the use of spinning oil G-1, and the resulting nylon 66 monofilament was evaluated for the abrasion tension, amount of static electricity generated, spinning oil coating weight, upper limit of the warping speed, weaving productivity, and vertical line quality. The results are shown in Table 3.

TABLE 3

| | | Comp. Ex. 1 | Ex. 1 | Ex. 2 | Ex. 3 | Ex. 4 | Comp. Ex. 2 | Comp. Ex. 3 | Ex. 5 | Ex. 6 | Ex. 7 | Ex. 8 | Ex. 9 | Comp. Ex. 4 | Comp. Ex. 5 |
|---|---|---|---|---|---|---|---|---|---|---|---|---|---|---|---|
| Spinning oil No. | | A-1 | A-2 | A-3 | B-1 | C-1 | E-1 | E-2 | E-3 | E-4 | E-5 | E-5 | A-2 | F-1 | G-1 |
| Diluent | | Pure water | Pure water | Pure water | Pure water | Pure water | Pure water | Pure water | Pure water | Pure water | Pure water | Pure water | Pure water | Mineral Oil | Pure water |
| Emulsion concentration | % | 5 | 5 | 5 | 5 | 5 | 5 | 5 | 5 | 5 | 5 | 5 | 5 | 5 | 5 |
| Spinning oil coating weight | % | 0.6 | 0.6 | 0.6 | 0.6 | 0.6 | 0.6 | 0.6 | 0.6 | 0.6 | 0.6 | 1.0 | 0.6 | 0.6 | 0.3 |
| Modified silicone coating weight | ppm | 15 | 15 | 15 | 15 | 15 | 0 | 3 | 5 | 9 | 21 | 35 | 15 | 0 | 1.5 |
| Package form | | Pirn shape | Pirn shape | Pirn shape | Pirn shape | Pirn shape | Pirn shape | Pirn shape | Pirn shape | Pirn shape | Pirn shape | Pirn shape | Pirn shape | Drum shape | Pirn shape |
| Fineness | dtex | 8 | 8 | 8 | 8 | 8 | 8 | 8 | 8 | 8 | 8 | 8 | 22 | 8 | 8 |
| Abrasion tension | cN/T | 0.25 | 0.25 | 0.29 | 0.25 | 0.25 | 0.35 | 0.32 | 0.29 | 0.27 | 0.2 | 0.24 | 0.25 | 0.6 | 0.34 |
| Amount of static electricity generated | V | 320 | 280 | 250 | 280 | 250 | 200 | 230 | 240 | 260 | 290 | 295 | 280 | 200 | 600 |
| Vertical line quality | | B | A | A | A | A | C | B | A | A | A | A | A | C | B |
| Upper limit of warping speed | m/min | 190 | 250 | 300 | 250 | 300 | 130 | 190 | 300 | 290 | 260 | 260 | 250 | 120 | 140 |
| Weaving productivity | | B | A | A | A | A | C | B | A | A | A | A | A | C | C |

As evident from the results shown in Table 3, the vertical line quality and weaving productivity were excellent in Examples 1 to 9 with low abrasion tension and low amount of static electricity generated. On the other hand, the vertical line quality and the weaving productivity were inferior in the Comparative Examples 2, 3, and 4 with high abrasion tension and low amount of static electricity generated. Weaving productivity was inferior in Comparative Example 1 where the abrasion tension was low while the amount of static electricity generated was high. The vertical line quality and the weaving productivity were inferior in Comparative Example 5 where both abrasion tension and amount of static electricity generated were high.

The invention claimed is:
1. A polyamide monofilament wherein abrasion tension upon passage through a ceramic guide is up to 0.3 cN/dtex and an amount of static electricity generated at an exit of a chromium round rod guide upon passage of the chromium round rod guide which is a frictional body is up to 300 V.

2. A fiber package prepared by winding the polyamide monofilament according to claim 1.

3. A fiber package according to claim 2 wherein the fiber package is in the shape of a pirn.

\* \* \* \* \*